(12) United States Patent
Zhou et al.

(10) Patent No.: US 11,300,648 B2
(45) Date of Patent: Apr. 12, 2022

(54) HIGH-RESOLUTION, ACCURATE, TWO-DIMENSIONAL DIRECTION-OF-ARRIVAL ESTIMATION METHOD BASED ON COARRAY TENSOR SPATIAL SPECTRUM SEARCHING WITH CO-PRIME PLANAR ARRAY

(71) Applicant: ZHEJIANG UNIVERSITY, Hangzhou (CN)

(72) Inventors: Chengwei Zhou, Hangzhou (CN); Hang Zheng, Hangzhou (CN); Jiming Chen, Hangzhou (CN); Zhiguo Shi, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/395,478

(22) Filed: Aug. 6, 2021

(65) Prior Publication Data
US 2021/0364591 A1 Nov. 25, 2021

Related U.S. Application Data

(63) Continuation of application No. PCT/CN2020/088567, filed on May 3, 2020.

(51) Int. Cl.
*G01S 3/14* (2006.01)
*G01S 3/02* (2006.01)
(Continued)

(52) U.S. Cl.
CPC .............. *G01S 3/143* (2013.01); *G01S 3/023* (2013.01); *G01S 3/046* (2013.01); *G01S 3/74* (2013.01)

(58) Field of Classification Search
None
See application file for complete search history.

(56) References Cited

U.S. PATENT DOCUMENTS

| 2008/0266177 A1* | 10/2008 | Chevalier | ................. G01S 3/74 |
| | | | 342/417 |
| 2018/0293506 A1* | 10/2018 | Lee | ......................... G06N 20/10 |
| 2019/0356394 A1* | 11/2019 | Bunandar | ............... H04J 14/02 |

FOREIGN PATENT DOCUMENTS

| CN | 107037392 A | 8/2017 |
| CN | 109471086 A | 3/2019 |

(Continued)

OTHER PUBLICATIONS

International Search Report (PCT/CN2020/088567); dated Feb. 1, 2021.
(Continued)

*Primary Examiner* — Whitney Moore
(74) *Attorney, Agent, or Firm* — W&G Law Group

(57) ABSTRACT

Disclosed is a high-resolution accurate two-dimensional direction-of-arrival estimation method based on coarray tensor spatial spectrum searching with coprime planar array, which solves the problem of multi-dimensional signal loss and limited spatial spectrum resolution and accuracy in existing methods. The implementation steps are: constructing a coprime planar array; tensor signal modeling for the coprime planar array; deriving coarray statistics based on coprime planar array cross-correlation tensor; constructing the equivalent signals of a virtual uniform array; deriving a spatially smoothed fourth-order auto-correlation coarray tensor; realizing signal and noise subspace classification through coarray tensor feature extraction; performing high-resolution accurate two-dimensional direction-of-arrival estimation based on coarray tensor spatial spectrum searching. In the present method, multi-dimensional feature extraction based on coarray tensor statistics for coprime planar array is used to implement high-resolution, accurate two-dimensional direction-of-arrival estimation based on tensor spatial spectrum searching, and the method can be used for passive detection and target positioning.

7 Claims, 2 Drawing Sheets

(51) Int. Cl.
  *G01S 3/04*   (2006.01)
  *G01S 3/74*   (2006.01)

(56) References Cited

FOREIGN PATENT DOCUMENTS

| CN | 110927661 A | 3/2020 |
| JP | 2017116425 A | 6/2017 |

OTHER PUBLICATIONS

"Two-Dimensional Coprime Vector-Sensor Array Signal Processing Based on Tensor Decompositions" (Gui, Yufeng et al.) [Aug. 31, 2019].
"Co-prime MIMO Radar Multi-parameter Estimation Based on Tensor Decomposition" (Fan, Jinyu et al.) [Apr. 30, 2015].
"A Tensor-Based Approach to L-Shaped Arrays Processing With Enhanced Degrees of Freedom" (Rao, Wei et al.) [Feb. 28, 2018].
"Tensor MUSIC in Multidimensional Sparse Arrays" (Liu, Chun-Lin et al.) [Nov. 11, 2015].
"Sparsity-Based Two-Dimensional DOA Estimation for Coprime Array: From Sum-Difference Coarray Viewpoint" (Shi, Junpeng et al.) [Nov. 30, 2017].
JP First Office Action (2021-541668); dated Jan. 5, 2022.

\* cited by examiner

HIGH-RESOLUTION, ACCURATE, TWO-DIMENSIONAL DIRECTION-OF-ARRIVAL ESTIMATION METHOD BASED ON COARRAY TENSOR SPATIAL SPECTRUM SEARCHING WITH CO-PRIME PLANAR ARRAY

TECHNICAL FIELD

The present disclosure belongs to the technical field of array signal processing, and particularly relates to a statistical signal processing technology based on coprime planar array tensor signals, in particular to a high-resolution accurate two-dimensional direction-of-arrival estimation method based on coarray tensor spatial spectrum searching with coprime planar array, which can be used for passive detection and target localization.

BACKGROUND

As a two-dimensional sparse array with a systematic architecture, the coprime planar array has the characteristics of large aperture and high resolution. Compared with the traditional uniform array, it can achieve a breakthrough in the comprehensive performance of two-dimensional direction-of-arrival estimation such as estimation accuracy and resolution; at the same time, by constructing a two-dimensional virtual array, the Nyquist-match signal processing can be performed on the virtual uniform planar array, thus solving the signal mismatch problem of the coprime planar array. The spatial spectrum of the coprime planar array is constructed based on coarray signals, and then the accurate two-dimensional direction-of-arrival estimation can be obtained by searching two-dimensional spectral peaks. Based on this idea, the traditional method usually represents the incident signal with two-dimensional spatial structure information by vectors, calculates the second-order statistics of a multi-snapshot signals by way of time averaging, and then derives the second-order equivalent signal in the virtual domain by vectorization. However, the received signal of the coprime planar array and its equivalent signals expressed in a vector form not only lose the multidimensional spatial structure information, but also easily cause dimensional disaster with the increase of data scale. Therefore, the accuracy and resolution of constructing spatial spectrum and obtaining two-dimensional direction-of-arrival estimation based on this method are still flawed.

In order to solve the above problems, the two-dimensional direction-of-arrival estimation method for a coprime planar array based on tensor spatial spectrum searching has attracted attention. Tensor, as a high-dimensional data structure, can preserve the original multi-dimensional information of signals; at the same time, multidimensional algebraic theories such as higher-order singular value decomposition and tensor decomposition also provide rich analytical tools for multidimensional feature extraction of tensor signals. Therefore, a tensor signal model can make full use of the multi-dimensional spatial structural information of incident signals of the coprime planar array. However, the existing method is still based on the first-order received tensor signals, and does not derive the two-dimensional virtual domain of the coprime planar array to construct the tensor spatial spectrum, which does not solve the problem of signal mismatch of the coprime planar array, resulting in the loss of accuracy; and the generated spectral peaks have low resolution and are easy to be overlapped with each other. Therefore, there is still much room for improvement in accuracy and resolution of the existing methods.

SUMMARY

The purpose of the present disclosure is to propose a high-resolution accurate two-dimensional direction-of-arrival estimation method based on coarray tensor spatial spectrum searching with coprime planar array, aiming at the problems of multi-dimensional spatial structural information loss and limited spatial spectrum resolution and precision performance in the above method; this method provides a feasible idea and an effective solution for establishing the connection between coprime planar array tensor signal statistics and coarray-based spatial spectrum, building a coarray tensor spatial spectrum searching framework, and realizing high-resolution and high-precision two-dimensional direction-of-arrival estimation.

The purpose of the invention is realized by the following technical solution: a high-resolution accurate two-dimensional direction-of-arrival estimation method based on coarray tensor spatial spectrum searching with coprime planar array, comprising the following steps of:

(1) constructing, by a receiving end, an architecture using $4M_xM_y+N_xN_y-1$ physical antenna array elements according to the structure of coprime planar array; wherein $M_x$, $N_x$ and $M_y$, $N_y$ are respectively a pair of prime integers, and $M_x<N_x$, $M_y<N_y$; the coprime planar array can be decomposed into two sparse uniform subarrays $\mathbb{U}_1$ and $\mathbb{U}_2$;

(2) assuming that there are K far-field narrowband incoherent signal sources from directions of $\{(\theta_1, \varphi_1), (\theta_2, \varphi_2), \ldots, (\theta_K, \varphi_K)\}$, then the received signals of the sparse subarray $\mathbb{U}_1$ of the coprime planar array being expressed by using a three-dimensional tensor $\mathcal{X}_1 \in \mathbb{C}^{2M_x \times 2M_y \times L}$ (L is the number of snapshots) as:

$$\mathcal{X}_1 = \sum_{k=1}^{K} a_{Mx}(\theta_k, \varphi_k) \circ a_{My}(\theta_k, \varphi_k) \circ s_k + \mathcal{N}_1,$$

where $s_k=[s_{k,1}, s_{k,2}, \ldots, s_{k,L}]^T$ is a multi-snapshot sampling signal waveform corresponding to the $k^{th}$ incident source, $[\bullet]^T$ represents transposition operation, $\circ$ represents a vector outer product, $\mathcal{N}_1$ is a noise tensor independent of each source, $a_{Mx}(\theta_k, \varphi_k)$ and $a_{My}(\theta_k, \varphi_k)$ are respectively steering vectors of $\mathbb{U}_1$ in x-axis and y-axis directions, corresponding to the $k^{th}$ source with a direction-of-arrival of $(\theta_k, \varphi_k)$, which are expressed as:

$$a_{Mx}(\theta_k, \varphi_k) = \left[1, e^{-j\pi u_1^{(2)} \sin(\varphi_k)\cos(\theta_k)}, \ldots, e^{-j\pi u_1^{(2M_x)} \sin(\varphi_k)\cos(\theta_k)}\right]^T,$$

$$a_{My}(\theta_k, \varphi_k) = \left[1, e^{-j\pi v_1^{(2)} \sin(\varphi_k)\cos(\theta_k)}, \ldots, e^{-j\pi v_1^{(2M_y)} \sin(\varphi_k)\cos(\theta_k)}\right]^T,$$

where $u_1^{(i_1)}$ ($i_1=1, 2, \ldots, 2M_x$) and $v_1^{(i_2)}$ ($i_2=1, 2, \ldots, 2M_y$) respectively represent actual positions of the $i_1^{th}$ physical sensor and the $i_2^{th}$ physical antenna sensor of the sparse subarray $\mathbb{U}_1$ in the x-axis and y-axis directions, and $u_1^{(1)}=0$, $v_1^{(1)}=0$, $j=\sqrt{-1}$;

the received signals of the sparse subarray $\mathbb{U}_2$ is expressed by using another three-dimensional tensor as $\mathcal{X}_2 \in \mathbb{C}^{N_x \times N_y \times L}$ as:

$$\mathcal{X}_2 = \sum_{k=1}^{K} a_{Nx}(\theta_k, \varphi_k) \circ a_{Ny}(\theta_k, \varphi_k) \circ s_k + \mathcal{N}_1,$$

where $\mathcal{N}_2$ is a noise tensor independent of each source, $a_{Nx}(\theta_k, \varphi_k)$ and $a_{Ny}(\theta_k, \varphi_k)$ are respectively steering vectors of the sparse subarray $\mathbb{U}_2$ in the X-axis and Y-axis directions, corresponding to the $k^{th}$ source with a direction-of-arrival of $(\theta_k, \varphi_k)$ which are expressed as:

$$a_{Nx}(\theta_k, \varphi_k) = \left[1, e^{-j\pi u_2^{(2)}\sin(\varphi_k)\cos(\theta_k)}, \ldots, e^{-j\pi u_2^{(N_x)}\sin(\varphi_k)\cos(\theta_k)}\right]^T,$$

$$a_{Ny}(\theta_k, \varphi_k) = \left[1, e^{-j\pi v_2^{(2)}\sin(\varphi_k)\cos(\theta_k)}, \ldots, e^{-j\pi v_2^{(N_y)}\sin(\varphi_k)\cos(\theta_k)}\right]^T,$$

where $u_2^{(i_3)}$ ($i_3=1, 2, \ldots, N_x$) and $v_2^{(i_4)}$ ($i_4=1, 2, \ldots, N_y$) respectively represent actual positions of the $i_3^{th}$ physical sensor and the $i_4^{th}$ physical antenna array element of the sparse subarray $\mathbb{U}_2$ in the x-axis and y-axis directions, and $u_2^{(1)}=0$, $v_2^{(1)}=0$;

a second-order cross-correlation tensor $\hat{\mathcal{R}} \in \mathbb{C}^{2M_x \times 2M_y \times N_x \times N_y}$ of the received tensor signals $\mathcal{X}_1$ and $\mathcal{X}_2$ of the subarrays $\mathbb{U}_1$ and $\mathbb{U}_2$ is calculated as follows:

$$\hat{\mathcal{R}} = \frac{1}{L}\sum_{l=1}^{L} x_1(l) \circ x_2^*(l),$$

where, $\mathcal{X}_1(l)$ and $\mathcal{X}_2(l)$ respectively represent the $l^{th}$ slice of $\mathcal{X}_1$ and $\mathcal{X}_2$ in a third dimension (i.e., the snapshot dimension), and $(\bullet)^*$ represents a conjugate operation;

(3) obtaining an augmented non-uniform virtual array $\mathcal{L}$ from the cross-correlation tensor $\hat{\mathcal{R}}$, wherein the position of each virtual sensor is expressed as:

$$\mathcal{L} = \{(M_x n_x d + N_x m_x d, -M_y n_y d + N_y m_y d) | 0 \leq n_x \leq N_x-1, 0 \leq m_x \leq 2M_x-1, 0 \leq n_y \leq N_y-1, 0 \leq m_y \leq 2M_y-1\},$$

where a unit interval d is half of wavelength $\lambda$ of the incident narrowband signal, that is, $d=\lambda/2$; dimension sets $\mathbb{J}_1=\{1, 3\}$ and $\mathbb{J}_2=\{2, 4\}$ are defined, and then an ideal value $\mathcal{R}$ (a noise-free scene) of the cross-correlation tensor $\hat{\mathcal{R}}$ is subjected to modulo$\{\mathbb{J}_1, \mathbb{J}_2\}$ PARAFAC-based tensor unfolding to obtain an ideal expression of the equivalent signals $V \in \mathbb{C}^{2M_x \times 2M_y N_y}$ of the augmented virtual array $\mathcal{L}$ as:

$$V \triangleq \mathcal{R}_{\{\mathbb{J}_1, \mathbb{J}_2\}} = \Sigma_{k=1}^K \sigma_k^2 a_x(\theta_k, \varphi_k) \circ a_y(\theta_k, \varphi_k),$$

where $a_x(\theta_k, \varphi_k) = a_{Nx}(\theta_k, \varphi_k) a_{Mx}(\theta_k, \varphi_k)$ and $a_y(\theta_k, \varphi_k) = a_{Ny}^*(\theta_k, \varphi_k) \otimes a_{My}(\theta_k, \varphi_k)$ are steering vectors of the augmented virtual array $\mathcal{L}$ in the x-axis and y-axis directions, corresponding to the $k^{th}$ source with a direction-of-arrival of $(\theta_k, \varphi_k)$; $\sigma_k^2$ represents the power of the $k^{th}$ incident signal source; $\otimes$ represents a Kronecker product; a subscript of the tensor represents the PARAFAC-based tensor unfolding operation;

(4) $\mathcal{L}$ containing a virtual array $\mathcal{J}$ with an x-axis distribution from $(-N_x+1)$ d to $(M_x N_x + M_x - 1)$d and a y-axis distribution from $(-N_y+1)$d to $(M_y N_y + M_y - 1)$d; wherein there are totally $D_x \times D_y$ virtual sensors in $\mathcal{J}$, where $D_x = M_x N_x + M_x + N_x - 1$, $D_y = M_y N_y + M_y + N_y - 1$, and $\mathcal{J}$ is expressed as:

$$\mathcal{J} = \{(x,y) | x = p_x d, y = p_y d, N_x+1 \leq p_x \leq M_x N_x + M_x - 1, -N_y+1 \leq p_y \leq M_y N_y + M_y - 1\},$$

by selecting elements in the coarray signals V corresponding to the position of each virtual sensor of $\mathcal{J}$, the equivalent signals $\bar{V} \in \mathbb{C}^{D_x \times D_y}$ of the virtual array $\mathcal{J}$ is obtained, and is expressed as:

$$\bar{V} = \Sigma_{k=1}^K \sigma_k^2 (\theta_k, \varphi_k) \circ b_y(\theta_k, \varphi_k),$$

where $b_x(\theta_k, \varphi_k) = [e^{-j\pi(-N_x+1)\sin(\varphi_k)\cos(\theta_k)}, e^{-j\pi(-N_x+2)\sin(\varphi_k)\cos(\theta_k)}, \ldots, e^{-j\pi(M_x N_x + M_x - 1)\sin(\varphi_k)\cos(\theta_k)}]$ and $b_y(\theta_k, \varphi_k) = [e^{-j\pi(-N_y+1)\sin(\varphi_k)\sin(\theta_k)}, e^{-j\pi(-N_y+2)\sin(\varphi_k)\sin(\theta_k)}, \ldots, e^{-j\pi(M_y N_y + M_y - 1)\sin(\varphi_k)\sin(\theta_k)}]$ are steering vectors of the virtual array $\mathcal{J}$ in the x-axis and y-axis directions, corresponding to $k^{th}$ source with a direction-of-arrival of $(\theta_k, \varphi_k)$;

(5) in the virtual array $\mathcal{J}$, taking a subarray with a size of $Y_1 \times Y_2$ for every other array element along the x-axis and y-axis directions respectively to divide the virtual array $\mathcal{J}$ into $L_1 \times L_2$ uniform subarrays partly overlapping with each other; expressing the above subarray as $\mathcal{J}_{(g_1, g_2)}$, $g_1=1, 2, \ldots, L_1$, $g_2=1, 2, \ldots, L_2$, and obtaining the equivalent signals $\bar{V}_{(g_1,g_2)} \in \mathbb{C}^{Y_1 \times Y_2}$ of the virtual subarray $\mathcal{J}_{(g_1,g_2)}$ according to respective position elements in the coarray signals $\bar{V}$ corresponding to the virtual subarray $\mathcal{J}_{(g_1,g_2)}$:

$$\bar{V}_{(g_1,g_2)} = \Sigma_{k=1}^K \sigma_k^2 (c_x(\theta_k, \varphi_k) e^{(g_1-1)\sin(\varphi_k)\cos(\theta_k)}) \circ (c_y(\theta_k, \varphi_k) e^{(g_2-1)\sin(\varphi_k)\sin(\theta_k)}),$$

where $$c_x(\theta_k, \varphi_k) = [e^{-j\pi(-N_x+1)\sin(\varphi_k)\cos(\theta_k)}, e^{-j\pi(-N_x+2)\sin(\varphi_k)\cos(\theta_k)}, \ldots, e^{-j\pi(M_x N_x + M_x - 1)\sin(\varphi_k)\cos(\theta_k)}]$$

and $$c_y(\theta_k, \varphi_k) = [e^{-j\pi(-N_y+1)\sin(\varphi_k)\sin(\theta_k)}, e^{-j\pi(-N_y+2)\sin(\varphi_k)\sin(\theta_k)}, \ldots, e^{-j\pi(M_y N_y + M_y - 1)\sin(\varphi_k)\sin(\theta_k)}]$$

are steering vectors of the virtual subarray $\mathcal{J}_{(1,1)}$ in the x-axis and y-axis corresponding to the direction of $(\theta_k, \varphi_k)$; after the above operation, a total of $L_1 \times L_2$ coarray signals $\bar{V}_{(g_1,g_2)}$ the dimensions of which are all $Y_1 \times Y_2$ are obtained; an average of the $L_1 \times L_2$ coarray signals $V\bar{V}_{(g_1,g_2)}$ is taken to obtain a spatially smoothed coarray signals $\tilde{V} \in \mathbb{C}^{Y_1 \times Y_2}$:

$$\tilde{V} = \frac{1}{L_1 L_2} \sum_{p=1}^{L_1} \sum_{q=1}^{L_2} \bar{V}_{(p,q)},$$

a fourth-order self-correlation tensor $\mathcal{V} \in \mathbb{C}^{Y_1 \times Y_2 \times Y_1 \times Y_2}$ for the coarray signals $\tilde{V}$ is calculated as follows:

$$\mathcal{V} = \tilde{V} \circ \tilde{V}^*;$$

(6) performing CANDECOMP/PARACFAC decomposition on the fourth-order self-correlation tensor $\mathcal{V}$ to extract multi-dimensional features, a result of which is expressed as follows:

$$\mathcal{V} = \Sigma_{k=1}^K \tilde{c}_x(\theta_k, \varphi_k) \circ \tilde{c}_y(\theta_k, \varphi_k) \circ \tilde{c}_x^*(\theta_k, \varphi_k) \circ \tilde{c}_y^*(\theta_k, \varphi_k),$$

where $\tilde{c}_x(\theta_k, \varphi_k)$ ($k=1, 2, \ldots, K$) and $\tilde{c}_y(\theta_k, \varphi_k)$ ($k=1, 2, \ldots, K$) are two orthogonal factor vectors obtained by the CANDECOMP/PARAFAC decomposition, respectively representing spatial information in the x-axis and y-axis directions; $C_x = [\tilde{c}_x(\theta_1, \varphi_1), \tilde{c}_x(\theta_2, \varphi_2), \ldots, \tilde{c}_x(\theta_K, \varphi_K)]$ and $C_y = [\tilde{c}_y(\theta_1, \varphi_1), \tilde{c}_y(\theta_2, \varphi_2), \ldots, \tilde{c}_y(\theta_K, \varphi_K)]$ are factor matrixes; a space expanded by $\{\tilde{c}_x(\theta_k, \varphi_k) \circ \tilde{c}_y(\theta_k, \varphi_k), k=1, 2, \ldots, K\}$ is taken and is recorded as span$\{\tilde{c}_x(\theta_k, \varphi_k) \circ \tilde{c}_y(\theta_k, \varphi_k), k=1, 2, \ldots, K\}$ as a signal subspace; the signal subspace is expressed using a tensor $\mathcal{Z}_s \in \mathbb{C}^{Y_1 \times Y_2 \times K}$, where $\mathcal{Z}_s(k)$ represents a $k^{th}$ slice of $\mathcal{Z}_s$ along the third dimension, which is expressed as:

$$\mathcal{Z}_s(k) = \tilde{c}_x(\theta_k, \varphi_k) \circ \tilde{c}_y(\theta_k, \varphi_k);$$

in order to obtain the noise subspace, the orthocomplements of the factor matrices $C_x$ and $C_y$ are calculated; the orthocomplement of $C_x$ is recorded as span$\{\tilde{d}_{x,h}$, h=1, 2, . . . , min($Y_1, Y_2$)-K$\}$, and the orthocomplement of $C_y$ is recorded as span$\{\tilde{d}_{y,h}$, h=1, 2, . . . , min($Y_1, Y_2$)-K$\}$; then span$\{\tilde{d}_{x,h} \circ \tilde{d}_{y,h}$, h=1, 2, . . . , min($Y_1, Y_2$)-K$\}$ is taken as the noise subspace, and the tensor $\mathcal{Z}_n \in \mathbb{C}^{Y_1 \times Y_2 \times (min(Y_1,Y_2)-K)}$ is used to express the noise subspace, and $\mathcal{Z}_n$(h) represents a $h^{th}$ slice of $\mathcal{Z}_n$ along the third dimension, which is expressed as:

$$\mathcal{Z}_n(h) = \tilde{d}_{x,n} \circ \tilde{d}_{y,h};$$

and (7) defining a two-dimensional direction-of-arrival $(\tilde{\theta}, \tilde{\varphi})$ for spectral peak searching, a $\tilde{\theta} \in [-90°, 90°]$, $\tilde{\varphi} \in [0°, 180°]$, and constructing steering information $F(\tilde{\theta}, \tilde{\varphi}) \in \mathbb{C}^{Y_1 \times Y_2}$ corresponding to the virtual array $\mathcal{J}$, which is expressed as:

$$F(\tilde{\theta}, \tilde{\varphi}) = c_x(\tilde{\theta}, \tilde{\varphi}) \circ c_y(\tilde{\theta}, \tilde{\varphi});$$

constructing a tensor spatial spectrum function $\mathcal{P}_{CP}(\tilde{\theta}, \tilde{\varphi})$ using the noise subspace obtained from the CANDECOMP/PARACFAC decomposition, which is expressed as follows:

$$\mathcal{P}_{CP}(\tilde{\theta}, \tilde{\varphi}) = \| \mathcal{Z}_n \times_{\{1,2\}} F(\tilde{\theta}, \tilde{\varphi}) \|_F^{-2},$$

where $<x_{\{Q\}}>$ represents a modulo $\{Q\}$ contraction operation of two tensors along the $Q^{th}$ dimension, which requires a same size of the $Q^{th}$ dimension of the two tensors; $\|\cdot\|_F$ represents a Frobenius norm; $\mathcal{Z}_n \in \mathbb{C}^{Y_1 \times Y_2 \times (min(Y_1,Y_2)-K)}$ and $F(\tilde{\theta}, \tilde{\varphi}) \in \mathbb{C}^{Y_1 \times Y_2}$ are subjected to modulo $\{1, 2\}$ reshaping operation along the $1^{st}$ and $2^{nd}$ dimensions to obtain a vector $p \in \mathbb{C}^{min(Y_1,Y_2)-K}$; after obtaining the spatial spectrum function $\mathcal{P}_{CP}(\tilde{\theta}, \tilde{\varphi})$, the spatial spectrum corresponding to searching directions of the two-dimensional direction-of-arrival is constructed, then the estimation of two-dimensional direction-of-arrival of the incident source is obtained by searching for the two-dimensional direction-of-arrival corresponding to the position of the spectral peak.

Furthermore, the structure of the coprime planar array described in step (1) can be specifically described as: a pair of sparse uniform planar subarrays $\mathbb{U}_1$ and $\mathbb{U}_2$ are constructed on a planar coordinate system xoy, where $\mathbb{U}_1$ contains $2M_x \times 2M_y$ antenna sensors, the array sensor spacing in the x-axis direction and the i-axis direction are $N_x d$ and $N_y d$ respectively, and the coordinate of which on xoy is $\{(N_x d m_x, N_y d m_y), m_x = 0, 1, \ldots, 2M_x - 1, m_y = 0, 1, \ldots, 2M_y - 1\}$; $\mathbb{U}_2$ contains $N_x \times N_y$ antenna sensors, the array sensor spacing in the x-axis direction and the y-axis direction are $M_x d$ and $M_y d$ respectively, and the coordinate of which on xoy is $\{(M_x d n_x, M_y d n_y), n_x = 0, 1, \ldots, N_x - 1, n_y = 0, 1, \ldots, N_y - 1\}$; wherein $M_x, N_x$ and $M_y, N_y$ are respectively a pair of coprime integers, and $M_x < N_x, M_y < N_y$; $\mathbb{U}_1$ and $\mathbb{U}_2$ are subjected to subarray combination in a way of overlapping array elements at (0,0) coordinate to obtain a coprime area array actually containing $4M_x M_y + N_x N_y - 1$ physical antenna sensors.

Furthermore, the cross-correlation tensor $\mathcal{R}$ described in step (3) can be ideally (a noise-free scene) modeled as:

$$\mathcal{R} = \sum_{k=1}^{K} \sigma_k^2 a_{Mx}(\theta_k, \varphi_k) \circ a_{My}(\theta_k, \varphi_k) \circ a^*_{Nx}(\theta_k, \varphi_k) \circ a^*_{Ny}(\theta_k, \varphi_k),$$

where $a_{Mx}(\theta_k, \varphi_k) \circ (\theta_k, \varphi_k)$ in $\mathcal{R}$ is equivalent to an augmented coarray along the x-axis, and $a_{My}(\theta_k, \varphi_k) \circ a^*_{Ny}(\theta_k, \varphi_k)$ is equivalent to an augmented coarray along the y-axis, so that the non-uniform virtual array $\mathcal{L}$ can be obtained.

Furthermore, the equivalent signals V of the virtual array $\mathcal{J}$ described in step (5) saves spatial structural information of the virtual array, however, since V can be regarded as the single snapshot coarray signals, the statistics thereof often have a rank deficiency problem; therefore, based on the idea of two-dimensional spatial smoothing, the coarray signals V are processed to construct multiple equivalent snapshot coarray signals; after the coarray signals are summed and averaged, the fourth-order auto-correlation tensor thereof is calculated; the position of the virtual sensor in the virtual subarray $\mathcal{J}_{(g_1,g_2)}$ is expressed as:

$$\mathcal{J}_{(g_1,g_2)} = \{(x,y) | x = p_x d, y = p_y d, -N_x + g_1 \le p_x \le -N_x + g_1 + Y_1 - 1, -N_y + g_2 \le p_y \le -N_y + g_2 + Y_2 - 1\},$$

the equivalent signals $\nabla_{(g_1,g_2)}$ of the virtual subarray $\mathcal{J}_{(g_1,g_2)}$ is obtained by selecting corresponding position elements in the coarray signals $\nabla$ through the subarray $\mathcal{J}_{(g_1,g_2)}$.

Furthermore, in addition to the CANDECOMP/PARACFAC decomposition, the extraction of the multi-dimensional features of the fourth-order auto-correlation tensor in the virtual domain in step (6) can also be realized by a high-order singular value decomposition, which is specifically expressed as:

$$\mathcal{V} = \mathcal{K} \times_1 D_x \times_2 D_y \times_3 D^*_x \times_4 D^*_y,$$

where $\times_Q$ represents a modulo Q inner product of the tensor and the matrix along the $Q^{th}$ dimension; $\mathcal{K}$ represents a kernel tensor containing high-order singular values, $D_x \in \mathbb{C}^{Y_1 \times Y_1}$, $D_y \in \mathbb{C}^{Y_2 \times Y_2}$, $D^*_x \in \mathbb{C}^{Y_1 \times Y_1}$ and $D^*_y \in \mathbb{C}^{Y_2 \times Y_2}$ represent singular matrixes corresponding to four dimensions of $\mathcal{V}$; the first K columns and the last $Y_1$-K columns of $D_x$ are separated into a signal subspace $D_{xs} \in \mathbb{C}^{Y_1 \times K}$ and a noise subspace $D_{xn} \in \mathbb{C}^{Y_1 \times (Y_1-K)}$; the first K columns and the last $Y_2$-K columns of $D_y$ are separated into a signal subspace $D_{ys} \in \mathbb{C}^{Y_2 \times K}$ and a noise subspace $D_{yn} \in \mathbb{C}^{Y_2 \times (Y_2-K)}$.

Furthermore, the specific steps of searching for two-dimensional spectrum peaks after obtaining the spatial spectrum function $\mathcal{P}_{CP}(\tilde{\theta}, \tilde{\varphi})$ in step (7) are: using $a°$ as a step length to gradually increase the value of $(\tilde{\theta}, \tilde{\varphi})$, wherein a search starting point of the two-dimensional direction-of-arrival $(\tilde{\theta}, \tilde{\varphi})$ is $(-90°, 0°)$, and an end point is $(90°, 180°)$; a spatial spectrum value of one $\mathcal{P}_{CP}(\tilde{\theta}, \tilde{\varphi})$ can be correspondingly calculated for each $(\tilde{\theta}, \tilde{\varphi})$, so that one spatial spectrum corresponding to $(\tilde{\theta}, \tilde{\varphi})$, $\tilde{\theta} \in [-90°, 90°]$, $\tilde{\varphi} \in [0°, 180°]$ can be constructed; there are K peaks in the spatial spectrum, and the values of $(\tilde{\theta}, \tilde{\varphi})$ corresponding to the K peaks are the two-dimensional direction-of-arrival estimation of the information source.

Furthermore, the construction of the tensor spatial spectrum described in step (7) can also be implemented using the noise subspace obtained based on the high-order singular value decomposition, which is expressed as $\mathcal{P}_{HOSVD}(\tilde{\theta}, \tilde{\varphi})$:

$$\mathcal{P}_{HOSVD}(\tilde{\theta}, \tilde{\varphi}) = \| F(\tilde{\theta}, \tilde{\varphi}) \times_1 D_{xn} D_{xn}^H \times_2 D_{yn} D_{yn}^H \|_F^{-2},$$

where, $(\cdot)^H$ represents a conjugate transposition operation; after obtaining the spatial spectrum function $\mathcal{P}_{HOSVD}(\tilde{\theta}, \tilde{\varphi})$, the two-dimensional direction-of-arrival estimation of the source can be obtained according to a two-dimensional spectral peak searching process.

Compared with the prior art, the present disclosure has the following advantages:

(1) in the present disclosure, the actual received signals of coprime planar array are represented by a tensor, which is different from the traditional method in vectorization characterization of two-dimensional spatial information and averaging snapshot information to obtain second-order statistics. In the present disclosure, each single snapshot signal is superimposed on the third dimension, and the spatial spectrum is estimated by using the second-order cross-correlation tensor containing four-dimensional spatial information, thus retaining the multi-dimensional spatial structure information of the actual incident signals of the coprime planar array.

(2) According to the present disclosure, an idea of subspace classification of coarray signals is constructed through tensor statistics analysis of virtual domain, which provides a theoretical basis for the construction of the tensor spatial spectrum, thereby solving the problem of signal mismatch of coprime planar arrays and realizing the construction of Nyquist-matched coarray tensor spatial spectrum;

(3) According to the present disclosure, multi-dimensional feature extraction is carried out on the fourth-order auto-correlation tensor of the coarray signals in a manner of tensor CANDECOMP/PARACFAC decomposition and high-order singular value decomposition, so that the connection between the virtual domain model and the signal and noise subspace is established, and a foundation is provided for realizing a tensor spatial spectrum with high precision and high resolution.

DESCRIPTION OF EMBODIMENTS

Hereinafter, the technical solution of the present disclosure will be further explained in detail with reference to the drawings.

Figure 1:
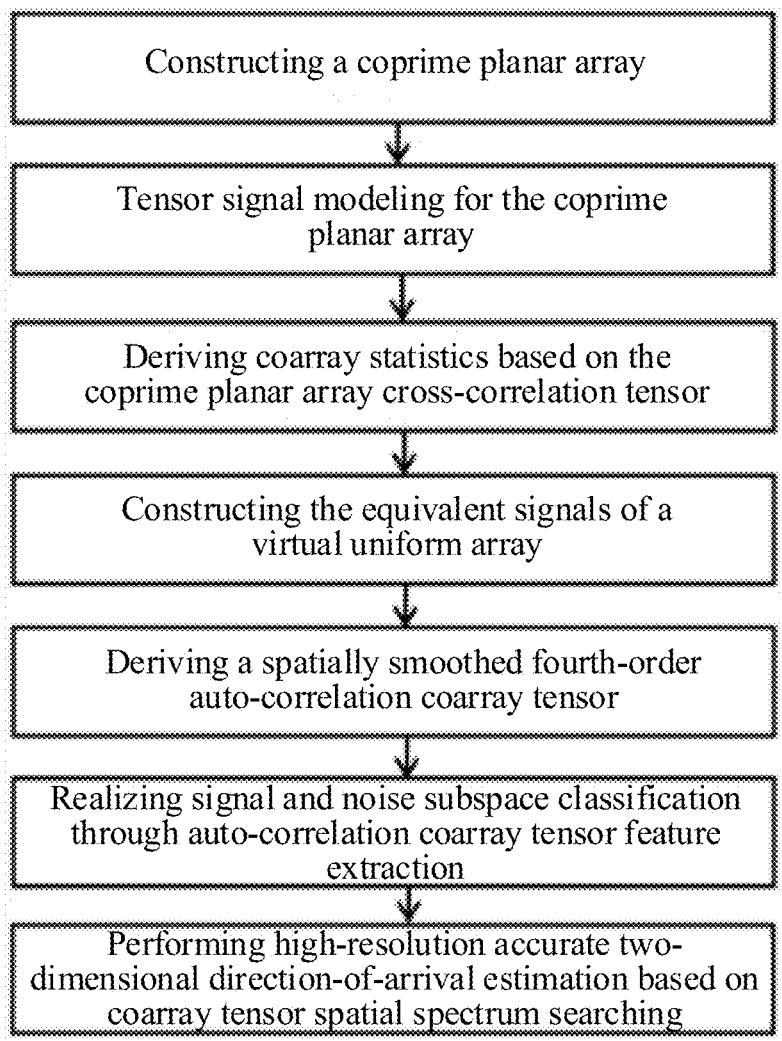
FIG. 1 is an overall flow diagram of the present disclosure.
Figure 2:
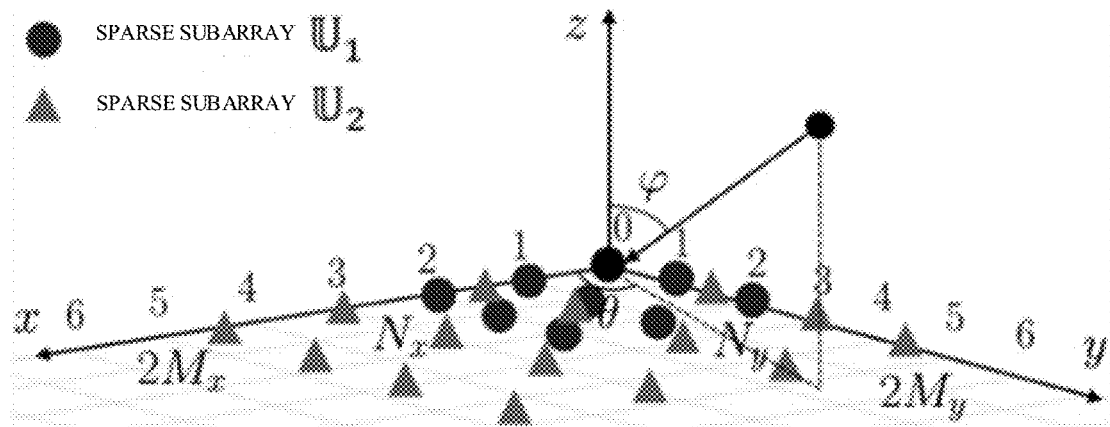
FIG. 2 is a schematic structural diagram of a coprime planar array according to the present disclosure.

In order to solve the problems of signal multi-dimensional spatial structural information loss and limited spatial spectrum resolution and precision performance existing in the existing method, the present disclosure provides a high-resolution accurate two-dimensional direction-of-arrival estimation method based on coarray tensor spatial spectrum searching with coprime planar array. Through statistical analysis of tensor signals received by the coprime planar array, coarray signals with spatial structure information of the virtual array are constructed; based on the multi-dimensional feature analysis of tensor statistics of virtual domain, the relationship between a virtual domain model and a tensor spatial spectrum is established, so as to realize a high-resolution accurate two-dimensional direction-of-arrival estimation method based on coarray tensor spatial spectrum searching. Referring to FIG. 1, the implementation steps of the present disclosure are as follows:

Step 1: a coprime planar array is constructed. A receiving end constructs a coprime planar array using $4M_xM_y+N_xN_y-1$ physical antenna array elements. As shown in FIG. 2: a pair of sparse uniform planar subarrays $\mathbb{U}_1$ and $\mathbb{U}_2$ are constructed on a planar coordinate system xoy, where $\mathbb{U}_1$ contains $2M_x \times 2M_y$ antenna array elements, an array element spacing in the x-axis direction and the y-axis direction are $N_xd$ and $N_yd$ respectively, the coordinate of which on xoy is $\{(N_xdm_x, N_ydm_y), m_x=0, 1, \ldots, 2M_x-1, m_y=0, 1, \ldots, 2M_y-1\}$; $\mathbb{U}_2$ contains $N_x \times N_y$ antenna array elements, an array element spacing in the x-axis direction and the y-axis direction are $M_xd$ and $M_yd$ respectively, and the coordinate of which on xoy is $\{(M_xdn_x, M_ydn_y), n_x=0, 1, \ldots, N_x-1, n_y=0, 1, \ldots, N_y-1\}$; here, $M_x$, $N_x$ and $M_y$, $N_y$ are respectively a pair of coprime integers, and $M_x<N_x$, $M_y<N_y$; the unit interval d is taken as half of the wavelength $\lambda$ of the incident narrowband signal, that is, $d=\lambda/2$; $\mathbb{U}_1$ and $\mathbb{U}_2$ are subjected to subarray combination in a way of overlapping array elements at a (0,0) coordinate to obtain a coprime area array actually containing $4M_xM_y+N_xN_y-1$ physical antenna array elements.

Step 2: tensor signal modeling for the coprime planar array; assuming that there are K far-field narrowband incoherent signal sources from directions of $\{(\theta_1, \varphi_1), (\theta_2, \varphi_2), \ldots, (\theta_K, \varphi_K)\}$, the received signals of the sparse subarray $\mathbb{U}_1$ of the coprime planar array is expressed by using a three-dimensional tensor signal $\mathcal{X}_1 \in \mathbb{C}^{2M_x \times 2M_y \times L}$ (L is a sampling snapshot number) as:

$$\mathcal{X}_1 = \sum_{k=1}^{K} a_{Mx}(\theta_k, \varphi_k) \circ a_{My}(\theta_k, \varphi_k) \circ s_k + \mathcal{N}_1,$$

where $s_k=[s_{k,1}, s_{k,2}, \ldots, s_{k,L}]^T$ is a multi-snapshot sampling signal waveform corresponding to a $k^{th}$ incident information source, $[\bullet]^T$ represents transposition operation, $\circ$ represents a vector outer product, $\mathcal{N}_1$ is a noise tensor independent of each signal source, $a_{Mx}(\theta_k, \varphi_k)$ and $a_{My}(\theta_k, \varphi_k)$ are respectively steering vectors of $\mathbb{U}_1$ in x-axis and y-axis directions, corresponding to the $k^{th}$ source with a direction-of-arrival of $(\theta_k, \varphi_k)$, which are expressed as:

$$a_{Mx}(\theta_k, \varphi_k) = \left[1, e^{-j\pi u_1^{(2)}\sin(\varphi_k)\cos(\theta_k)}, \ldots, e^{-j\pi u_1^{(2M_x)}\sin(\varphi_k)\cos(\theta_k)}\right]^T,$$

$$a_{My}(\theta_k, \varphi_k) = \left[1, e^{-j\pi v_1^{(2)}\sin(\varphi_k)\cos(\theta_k)}, \ldots, e^{-j\pi v_1^{(2M_y)}\sin(\varphi_k)\cos(\theta_k)}\right]^T,$$

where $u_1^{(i_1)}$ ($i_1=1, 2, \ldots, 2M_x$) and $v_1^{(i_2)}$ ($i_2=1, 2, \ldots, 2M_y$) respectively represent actual positions of the $i_1^{th}$ physical antenna sensor and the $i_2^{th}$ physical antenna sensor of the sparse subarray $\mathbb{U}_1$ in the x-axis and y-axis directions, and $u_1^{(1)}=0$, $v_1^{(1)}=0$, $j=\sqrt{-1}$.

Similarly, the received signals of the sparse subarray $\mathbb{U}_2$ can be expressed by using another three-dimensional tensor $\mathcal{X}_2 \in \mathbb{C}^{N_x \times N_y \times L}$ as:

$$\mathcal{X}_2 = \sum_{k=1}^{K} a_{Nx}(\theta_k, \varphi_k) \circ a_{Ny}(\theta_k, \varphi_k) \circ s_k + \mathcal{N}_2,$$

where $\mathcal{N}_2$ is a noise tensor independent of each signal source, $a_{Nx}(\theta_k, \varphi_k)$ and $a_{Ny}(\theta_k, \varphi_k)$ are respectively steering vectors of the sparse subarray $\mathbb{U}_2$ in the X-axis and Y-axis directions, corresponding to the $k^{th}$ source with a direction-of-arrival of $(\theta_k, \varphi_k)$ which are expressed as:

$$a_{Nx}(\theta_k, \varphi_k) = \left[1, e^{-j\pi u_2^{(2)}\sin(\varphi_k)\cos(\theta_k)}, \ldots, e^{-j\pi u_2^{(N_x)}\sin(\varphi_k)\cos(\theta_k)}\right]^T,$$

$$a_{Ny}(\theta_k, \varphi_k) = \left[1, e^{-j\pi v_2^{(2)}\sin(\varphi_k)\cos(\theta_k)}, \ldots, e^{-j\pi v_2^{(N_y)}\sin(\varphi_k)\cos(\theta_k)}\right]^T,$$

where $u_2^{(i_3)}$ ($i_3=1, 2, \ldots, N_x$) and $v_2^{(i_4)}$ ($i_4=1, 2, \ldots, N_y$) respectively represent actual positions of a $i_3^{th}$ physical antenna array element and a $i_4^{th}$ physical antenna array element of the sparse subarray $\mathbb{U}_2$ in the x-axis and y-axis directions, and $u_2^{(1)}=0$, $\mathcal{V}_2^{(1)}=0$;

a second-order cross-correlation tensor $\hat{\mathcal{R}} \in \mathbb{C}^{2M_x \times 2M_y \times N_x \times N_y}$ of the received tensor signals $\mathcal{X}_1$ and $\mathcal{X}_2$ of the subarrays $\mathbb{U}_1$ and $\mathbb{U}_2$ is calculated as follows:

$$\hat{R} = \frac{1}{L}\sum_{l=1}^{L} x_1(l) \circ x_2^*(l),$$

where, $\mathcal{X}_1(l)$ and $\mathcal{X}_2(l)$ respectively represent a $l^{th}$ slice of $\mathcal{X}_1$ and $\mathcal{X}_2$ in a third dimension (i.e., a snapshot dimension), and $(\bullet)^*$ represents a conjugate operation.

Step 3: the coarray signals based on a second-order cross-correlation tensor for the coprime planar array are derived. The second-order cross-correlation tensor $\hat{\mathcal{R}}$ of the tensor signal received by two subarrays of the coprime planar array can be ideally (a noise-free scene) modeled as:

$$\mathcal{R} = \Sigma_{k=1}^{K} \sigma_k^2 a_{Mx}(\theta_k,\varphi_k) \circ a_{My}(\theta_k,\varphi_k) \circ a^*_{Nx}(\theta_k,\varphi_k) \circ a^*_{Ny}(\theta_k,\varphi_k),$$

where $\sigma_k^2$ represents the power of the $k^{th}$ incident signal source; here, $a_{Mx}(\theta_k,\varphi_k) \circ a^*_{Nx}(\theta_k,\varphi_k)$ in $\mathcal{R}$ is equivalent to an augmented virtual domain along the x-axis, $a_{My}(\theta_k,\varphi_k) \circ a^*_{Ny}(\theta_k,\varphi_k)$ is equivalent to an augmented virtual domain along the y-axis, and thereby the non-uniform virtual array $\mathcal{L}$ can be obtained.

Figure 3:
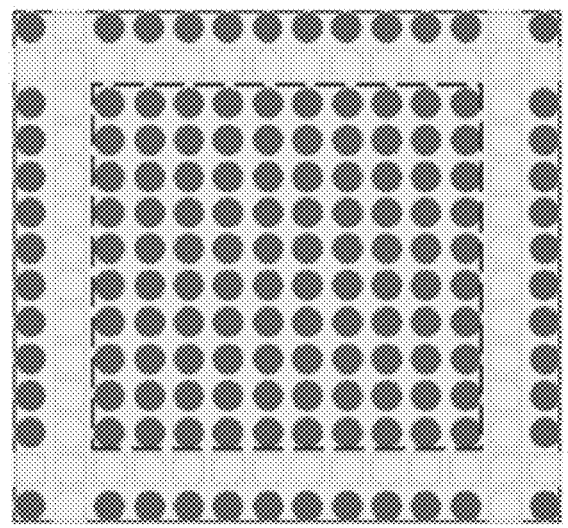
FIG. 3 is a schematic diagram of an augmented virtual array structure derived from the present disclosure.

As shown in FIG. 3, the position of each virtual sensor is expressed as:

$$\mathcal{L} = \{(-M_x n_x d + N_x m_x d, -M_y n_y d + N_y m_y d) | 0 \le n_x \le N_x - 1, 0 \le m_x \le 2M_x - 1, 0 \le n_y \le N_y - 1, 0 \le m_y \le 2M_y - 1\}.$$

In order to obtain the equivalent received signal corresponding to the augmented virtual domain area array $\mathcal{L}$, the first and third dimensions representing the spatial information in the x-axis direction in the cross-correlation tensor $\mathcal{R}$ are combined into one dimension, and the second and fourth dimensions representing the spatial information in the y-axis direction are combined into one dimension. The dimensional combination of the tensor can be realized by PARAFAC-based tensor unfolding. Dimension sets $\mathbb{J}_1 = \{1, 3\}$ and $\mathbb{J} = \{2, 4\}$ are defined, and then an ideal value $\mathcal{R}$ (a noise-free scene) of the cross-correlation tensor $\hat{\mathcal{R}}$ is subjected to modulo $\{\mathbb{J}_1, \mathbb{J}_2\}$ PARAFAC-based tensor unfolding to obtain an ideal expression of the equivalent received signals $V \in \mathbb{C}^{2M_x N_x \times 2M_y N_y}$ of the augmented virtual array $\mathcal{L}$ as:

$$V \triangleq \mathcal{R}_{\{\mathbb{J}_1, \mathbb{J}_2\}} = \Sigma_{k=1}^{K} \sigma_k^1 a_x(\theta_k,\varphi_k) \circ a_y(\theta_k,\varphi_k),$$

where $a_x(\theta_k, \varphi_k) = a^*_{Nx}(\theta_k, \varphi_k) \otimes a_{Mx}(\theta_k, \varphi_k)$ and $a_y(\theta_k, \varphi_k) = a^*_{Ny}(\theta_k, \varphi_k) \otimes a_{My}(\theta_k, \varphi_k)$ are steering vectors of the augmented virtual array $\mathcal{L}$ in the x-axis and y-axis directions, corresponding to $k^{th}$ signal source with a direction-of-arrival of $(\theta_k, \varphi_k)$; $\sigma_k^2$ represents the power of a $k^{th}$ incident signal source; $\otimes$ represents a Kronecker product.

Step 4: the coarray signals of a virtual uniform array is constructed. $\mathcal{L}$ contains a virtual array $\mathbb{J}$ with an x-axis distribution from $(-N_x+1)d$ to $(M_x N_x + M_x - 1)d$ and a y-axis distribution from $(-N_y+1)d$ to $(M_y N_y + M_y - 1)d$; wherein there are $D_x \times D_y$ virtual sensors in total in $\mathbb{J}$, where $D_x = M_x N_x + M_x + N_x - 1$, $D_y = m_y N_y + M_y + N_y - 1$, and $\mathbb{J}$ is expressed as:

$$\mathbb{J} = \{(x,y) | x = p_x d, y = p_y d, -N_x + 1 \le p_x \le M_x N_x + M_x - 1, -N_y + 1 \le p_y \le M_y N_y + M_y - 1\},$$

by selecting elements in the coarray signal V corresponding to the position of each virtual sensor of $\mathbb{J}$, the equivalent signals $\tilde{V} \in \mathbb{C}^{D_x \times D_y}$ of the virtual array $\mathbb{J}$ is obtained, and is expressed as:

$$\tilde{V} = \sum_{k=1}^{K} \sigma_k^2 b_x(\theta_k, \varphi_k) \circ b_y(\theta_k, \varphi_k),$$

where $b_x(\theta_k, \varphi_k) = [e^{-j\pi(-N_x+1)sin(\varphi_k)cos(\theta_k)}, e^{-j\pi(-N_x+2)sin(\varphi_k)cos(\theta_k)}, \ldots, e^{-j\pi(M_x N_x + M_x - 1)sin(\varphi_k)cos(\theta_k)}]$ and $b_y(\theta_k, \varphi_k) = [e^{-j\pi(-N_y+1)sin(\varphi_k)sin(\theta_k)}, e^{-j\pi(-N_y+2)sin(\varphi_k)sin(\theta_k)}, \ldots, e^{-j\pi(M_y N_y + M_y - 1)sin(\varphi_k)sin(\theta_k)}]$ are steering vectors of the virtual array $\mathbb{J}$ in the x-axis and y-axis directions, corresponding to $k^{th}$ source with a direction-of-arrival of $(\theta_k, \varphi_k)$.

Step 5: a spatially smoothed auto-correlation coarray tensor is derived. The equivalent signal $\tilde{V}$ of the virtual array $\mathbb{J}$ is obtained from the above step. The equivalent signal $\tilde{V}$ of the virtual $\mathbb{J}$ described in step (5) saves spatial structure information of the virtual domain area array, however, since $\tilde{V}$ can be regarded as a virtual domain signal of a single snapshot, the statistics thereof often have a rank deficiency problem; therefore, based on the idea of two-dimensional spatial smoothing, the virtual domain signal $\tilde{V}$ is processed to construct multiple equivalent snapshot virtual domain subarray signals; after the virtual domain subarray signals are summed and averaged, the fourth-order self-correlation tensor thereof is calculated. The specific process is as below: in the virtual array $\mathbb{J}$, taking a subarray with a size of $Y_1 \times Y_2$ for every other array element along the x-axis and y-axis directions respectively to divide the virtual $\mathbb{J}$ into $L_1 \times L_2$ uniform subarrays partly overlapping with each other; $L_1$, $L_2$, $Y_1$, $Y_2$ satisfy the following relationship:

$$Y_1 + L_1 - 1 = M_x N_x + M_x + N_x - 1,$$

$$Y_2 + L_2 - 1 = M_y N_y + M_y + N_y - 1;$$

the above subarray is expressed as $\mathbb{J}_{(g_1, g_2)}$, $g_1 = 1, 2, \ldots, L_1$, $g_2 = 1, 2, \ldots, L_2$, and the position of the array element in $\mathbb{J}_{(g_1, g_2)}$ is expressed as:

$$\mathbb{J}_{(g_1, g_2)} = \{(x,y) | x = p_x d, y = p_y d, -N_x + g_1 \le p_x \le -N_x + g_1 + Y_1 - 1, -N_y + g_2 \le p_y \le -N_y + g_2 + Y_2 - 1\};$$

an equivalent signal $\tilde{V}_{(g_1, g_2)} \in \mathbb{C}^{Y_1 \times Y_2}$ of the virtual subarray $\mathbb{J}_{(g_1, g_2)}$ is obtained according to respective position elements in the coarray signals $\tilde{V}$ corresponding to the subarray $\mathbb{J}_{(g_1, g_2)}$:

$$\tilde{V}_{(g_1,g_2)} = \Sigma_{k=1}^{K} \sigma_k^2 (c_x(\theta_k, \varphi_k) e^{(g_1-1)sin(\varphi_k)cos(\theta_k)}) \circ (c_y(\theta_k, \varphi_k) e^{(g_2-1)sin(\varphi_k)sin(\theta_k)}),$$

where $$c_x(\theta_k, \varphi_k) = [e^{-j\pi(-N_x+1)sin(\varphi_k)cos(\theta_k)}, e^{-j\pi(-N_x+2)sin(\varphi_k)cos(\theta_k)}, \ldots, e^{-j\pi(M_x N_x + M_x - 1)sin(\varphi_k)cos(\theta_k)}] \text{ and}$$

$$c_y(\theta_k, \varphi_k) = [e^{-j\pi(-N_y+1)sin(\varphi_k)sin(\theta_k)}, e^{-j\pi(-N_y+2)sin(\varphi_k)sin(\theta_k)}, \ldots, e^{-j\pi(M_y N_y + M_y - 1)sin(\varphi_k)sin(\theta_k)}]$$

are steering vectors of the virtual subarray $\mathbb{J}_{(1,1)}$ in the x-axis and y-axis corresponding to the direction of $(\theta_k, \varphi_k)$; after the above operation, a total of $L_1 \times L_2$ coarray signals $\tilde{V}_{(g_1, g_2)}$ the dimensions of which are all $Y_1 \times Y_2$ are obtained; an average of the $L_1 \times L_2$ coarray signals $\tilde{V}_{(g_1, g_2)}$ is taken to obtain a spatially smoothed signal $\check{V} \in \mathbb{C}^{Y_1 \times Y_2}$:

$$\check{V} = \frac{1}{L_1 L_2} \sum_{p=1}^{L_1} \sum_{q=1}^{L_2} \tilde{V}_{(p,q)},$$

a fourth-order self-correlation tensor $\mathcal{V} \in \mathbb{C}^{Y_1 \times Y_2 \times Y_1 \times Y_2}$ for the coarray signals $\check{V}$ is calculated as follows:

$$\mathcal{V} = \check{V} \circ \check{V}^*.$$

Step 6: signal and noise subspace classification is realized on the basis of multi-dimensional feature extraction of the auto-correlation coarray tensor. In order to construct a tensor spatial spectrum based on the idea of subspace classification, CANDECOMP/PARACFAC decomposition is performed on the fourth-order self-correlation tensor $\mathcal{V}$ to extract multi-dimensional features, a result of which is expressed as follows:

$$\mathcal{V} = \sum_{k=1}^{K} \tilde{c}_x(\theta_k, \varphi_k) \circ \tilde{c}_y(\theta_k, \varphi_k) \circ \tilde{c}^*_x(\theta_k, \varphi_k) \circ \tilde{c}^*_y(\theta_k, \varphi_k),$$

where $\tilde{c}_x(\theta_k, \varphi_k)(k=1, 2, \ldots, K)$ and $\tilde{c}_y(\theta_k, \varphi_k)(k=1, 2, \ldots, K)$ are two orthogonal factor vectors obtained by the CANDECOMP/PARACFAC decomposition, respectively representing spatial information in the x-axis and y-axis directions; $C_x = [\tilde{c}_x(\theta_1, \varphi_1), \tilde{c}_x(\theta_2, \varphi_2), \ldots, \tilde{c}_x(\theta_K, \varphi_K)]$ and $C_y = [\tilde{c}_y(\theta_1, \varphi_1), \tilde{c}_y(\theta_2, \varphi_2), \ldots, \tilde{c}_y(\theta_K, \varphi_K)]$ are factor matrixes; a space expanded by $\{\tilde{c}_x(\theta_k, \varphi_k) \circ \tilde{c}_y(\theta_k, \varphi_k), k=1, 2, \ldots, K\}$ is taken and is recorded as $\text{span}\{\tilde{c}_x(\theta_k, \varphi_k) \circ \tilde{c}_y(\theta_k, \varphi_k), k=1, 2, \ldots, K\}$ as a signal subspace; the signal subspace is expressed using a tensor $\mathcal{Z}_s \in \mathbb{C}^{Y_1 \times Y_2 \times K}$ where $\mathcal{Z}_s(k)$ represents a $k^{th}$ slice of $\mathcal{Z}_s$ along the third dimension, which is expressed as:

$$\mathcal{Z}_s(k) = \tilde{c}_x(\theta_k, \varphi_k) \circ \tilde{c}_y(\theta_k, \varphi_k);$$

in order to obtain the noise subspace, the orthocomplements of the factor matrices $C_x$ and $C_y$ are calculated; the orthocomplement of $C_x$ is recorded as $\text{span}\{\tilde{d}_{x,h}, h=1, 2, \ldots, \min(Y_1, Y_2)-K\}$, and the orthocomplement of $C_y$ is recorded as $\text{span}\{\tilde{d}_{y,h}, h=1, 2, \ldots, \min(Y_1, Y_2) K\}$, where $\min(\circ)$ represents the operation of taking the minimum value; then $\text{span}\{\tilde{d}_{x,h} \circ \tilde{d}_{y,h}, h=1, 2, \ldots, \min(Y_1, Y_2)-K\}$ is taken as the noise subspace, and the tensor $\mathcal{Z}_n \in \mathbb{C}^{Y_1 \times Y_2 \times (\min(Y_1, Y_2)-K)}$ is used to express the noise subspace, and $\mathcal{Z}_n(h)$ represents a $h^{th}$ slice of $\mathcal{Z}_n$ along the third dimension, which is expressed as:

$$\mathcal{Z}_n(h) = \tilde{d}_{x,h} \circ \tilde{d}_{y,h};$$

in addition to the CANDECOMP/PARACFAC decomposition, the extraction of the multi-dimensional features of the fourth-order self-correlation tensor in the virtual domain in step (6) can also be realized by a high-order singular value decomposition, which is specifically expressed as:

$$\mathcal{V} = \mathcal{K} \times_1 D_x \times_2 D_y \times_3 D^*_x \times_4 D^*_y,$$

where $\times_Q$ represents a modulo $Q$ inner product of the tensor and the matrix along the $Q^{th}$ dimension; $\mathcal{K}$ represents a kernel tensor containing high-order singular values, $D_x \in \mathbb{C}^{Y_1 \times Y_1}$, $D_y \in \mathbb{C}^{Y_2 \times Y_2}$, $D^*_x \in \mathbb{C}^{Y_1 \times Y_1}$ and $D^*_y \in \mathbb{C}^{Y_2 \times Y_2}$ represent singular matrixes corresponding to four dimensions of $\mathcal{V}$; the first $K$ columns and the last $Y_1-K$ columns of $D_x$ are separated into a signal subspace $D_{xs} \in \mathbb{C}^{Y_1 \times K}$ and a noise subspace $D_{xn} \in \mathbb{C}^{Y_1 \times (Y_1-K)}$; the first $K$ columns and the last $Y_2-K$ columns of $D_y$ are separated into a signal subspace $D_{ys} \in \mathbb{C}^{Y_2 \times K}$ and a noise subspace $D_{yn} \in \mathbb{C}^{Y_2 \times (Y_2-K)}$.

Step 7: high-resolution accurate two-dimensional direction-of-arrival estimation based on coarray tensor spatial spectrum searching. A two-dimensional direction-of-arrival $(\tilde{\theta}, \tilde{\varphi})$ for spectral peak searching is defined, a $\tilde{\theta} \in [-90°, 90°]$, $\tilde{\varphi} \in [0°, 180°]$, and steering information $F(\tilde{\theta}, \tilde{\varphi}) \in \mathbb{C}^{Y_1 \times Y_2}$ corresponding to the virtual array $\mathbb{J}$ are constructed, which is expressed as:

$$F(\tilde{\theta}, \tilde{\varphi}) = c_x(\tilde{\theta}, \tilde{\varphi}) \circ c_y(\tilde{\theta}, \tilde{\varphi}),$$

a tensor spatial spectrum function $\mathcal{P}_{CP}(\tilde{\theta}, \tilde{\varphi})$ is constructed using the noise subspace obtained from the CANDECOMP/PARACFAC decomposition, which is expressed as follows:

$$\mathcal{P}_{CP}(\tilde{\theta}, \tilde{\varphi}) = \|< \mathcal{Z}_n \times_{\{1,2\}} F(\tilde{\theta}, \tilde{\varphi}) >\|_F^{-2},$$

where $<\mathcal{X}_{\{Q\}}>$ represents a modulo $\{Q\}$ contraction operation of two tensors along a $Q^{th}$ dimension, which requires a same size of the $Q^{th}$ dimension of the two tensors; $\|\cdot\|_F$ represents a Frobenius norm; $z_n \in \mathbb{C}^{Y_1 \times Y_2 \times (\min(Y_1, Y_2)-K)}$ and $F(\tilde{\theta}, \tilde{\varphi}) \in \mathbb{C}^{Y_1 \times Y_2}$ are subjected to modulo $\{1, 2\}$ reshaping along the $1^{st}$ and $2^{nd}$ dimensions to obtain one vector $p \in \mathbb{C}^{\min(Y_1, Y_2)-K}$;

after obtaining the spatial spectrum function $\mathcal{P}_{CP}(\tilde{\theta}, \tilde{\varphi})$, the estimation of two-dimensional direction-of-arrival of the incident source is obtained by searching for the two-dimensional spectral peak. The specific steps are: using a° as a step length to gradually increase the value of $(\tilde{\theta}, \tilde{\varphi})$, wherein a search starting point of the two-dimensional direction-of-arrival $(\tilde{\theta}, \tilde{\varphi})$ is $(-90°, 0°)$, and an end point is $(90°, 180°)$; a spatial spectrum value of one $\mathcal{P}_{CP}(\tilde{\theta}, \tilde{\varphi})$ can be correspondingly calculated for each $(\tilde{\theta}, \tilde{\varphi})$, so that one spatial spectrum corresponding to $(\tilde{\theta}, \tilde{\varphi})$, $\tilde{\theta} \in [-90°, 90°]$, $\tilde{\varphi} \in [0°, 180°]$ can be constructed; there are $K$ peaks in the spatial spectrum, and the values of $(\tilde{\theta}, \tilde{\varphi})$ corresponding to the $K$ peaks are the two-dimensional direction-of-arrival estimation of the information source.

The effect of the present disclosure will be further described with a simulation example.

The construction of the tensor spatial spectrum can be implemented using the noise subspace obtained based on the high-order singular value decomposition, which is expressed as $\mathcal{P}_{HOSVD}(\tilde{\theta}, \tilde{\varphi})$:

$$\mathcal{P}_{HOSVD}(\tilde{\theta}, \tilde{\varphi}) = \|F(\tilde{\theta}, \tilde{\varphi}) \times_1 D_{xn} D_{xn}^H \times_2 D_{yn} D_{yn}^H\|^{-2},$$

where, $(\bullet)^H$ represents a conjugate transposition operation; after obtaining the spatial spectrum function $\mathcal{P}_{HOSVD}(\tilde{\theta}, \tilde{\varphi})$, the two-dimensional direction-of-arrival estimation of the source can be obtained according to a two-dimensional spectral peak searching process.

The effects of the present disclosure will be further described in the following in combination with examples of simulation.

Example of Simulation:

A coprime array is used to receive an incident signal, and its parameters are selected as $M_x=2$, $M_y=2$, $N_x=3$, $N_y=3$, that is, the coprime array of the architecture consists of $4M_xM_y+N_xN_y-1=24$ physical elements. It is assumed that the number of incident narrowband signals is 1, and the azimuth angle and elevation angle of the incident direction are [45°, 50° respectively. L=500 sampling snapshots and 10 dB input signal-to-noise ratio are used for simulation experiment.

Figure 4:
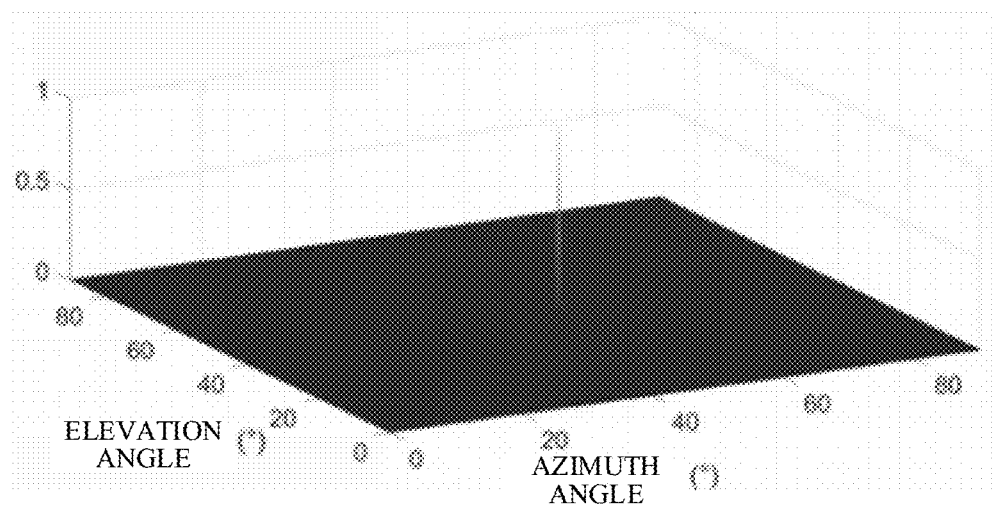
FIG. 4 is a schematic diagram of a tensor spatial spectrum constructed by the present disclosure.

The spatial spectrum of the high-resolution accurate two-dimensional direction-of-arrival estimation method based on coarray tensor spatial spectrum searching of a coprime planar array is shown in FIG. 4. It can be seen that the proposed method can effectively construct a two-dimensional spatial spectrum, in which there is a sharp spectral peak in the two-dimensional direction-of-arrival corresponding to the incident source, and the values of X axis and Y axis corresponding to the spectral peak are the elevation angle and azimuth angle of the incident source.

To sum up, the invention fully considers the multi-dimensional structural information of coprime planar array signals, constructs coarray signals with spatial structural information of a virtual planar array by using tensor signal modeling, establishes a subspace classification idea based on auto-correlation coarray tensor multi-dimensional feature extraction by analyzing tensor statistical characteristics, builds the connection between a coprime planar array virtual domain model and a tensor spatial spectrum, and solves the signal mismatch problem of the coprime planar array. Meanwhile, by using two tensor feature extraction method, namely tensor decomposition and high-order singular value decomposition, the construction mechanism of high-precision and high-resolution tensor spatial spectrum is proposed, and compared with the existing method, a breakthrough is made in spatial spectrum resolution and performance of the two-dimensional direction-of-arrival estimation accuracy.

The above is only the preferred embodiment of the present disclosure. Although the present disclosure has been disclosed as a preferred embodiment, it is not intended to limit the present disclosure. Without departing from the scope of the technical solution of the present disclosure, any person familiar with the field can make many possible changes and modifications to the technical solution of the present disclosure by using the methods and technical contents disclosed above, or modify them into equivalent embodiments with equivalent changes. Therefore, any simple modifications, equivalent changes and modifications made to the above embodiments according to the technical essence of the present disclosure are still within the scope of protection of the technical solution of the present disclosure.

What is claimed is:

1. A high-resolution accurate two-dimensional direction-of-arrival estimation method based on coarray tensor spatial spectrum searching with coprime planar array, comprising the following steps of:

(1) providing a receiving end, which is constituted by $4M_xM_y+N_xN_y-1$ physical antenna sensors arranged in a coprime planar array, wherein $M_x$, $N_x$ and $M_y$, $N_y$ are respectively a pair of prime integers, and $M_x<N_x$, $M_y<N_y$; and the receiving end is decomposed into two sparse uniform subarrays, which are respectively a first sparse uniform subarray $\mathbb{U}_1$ and a second sparse uniform subarray $\mathbb{U}_2$;

(2) receiving, by the receiving end, signals of K far-field narrowband incoherent sources from directions of $\{(\theta_1, \varphi_1), (\theta_2, \varphi_2), \ldots, (\theta_K, \varphi_K)\}$; and processing the signals as the following manner;

the received signals of the first sparse subarray $\mathbb{U}_1$ being expressed by using a three-dimensional tensor $\mathcal{X}_1 \in \mathbb{C}^{2M_x \times 2M_y \times L}$ (L is the number of snapshots) as:

$$x_1 = \sum_{k=1}^{K} a_{Mx}(\theta_k, \varphi_k) \circ a_{My}(\theta_k, \varphi_k) \circ s_k + \mathcal{N}_1,$$

where $s_k=[s_{k,1}, s_{k,2}, \ldots, s_{k,L}]^T$ is a multi-snapshot sampling signal waveform corresponding to the $k^{th}$ incident source, $[\bullet]^T$ represents transposition operation, $\circ$ represents a vector outer product, $\mathcal{N}_1$ is a noise tensor independent of each source, $a_{Mx}(\theta_k, \varphi_k)$ and $a_{My}(\theta_k, \varphi_k)$ are respectively steering vectors of the first sparse uniform subarray $\mathbb{U}_1$ in x-axis and y-axis directions, corresponding to the $k^{th}$ source with a direction-of-arrival of $(\theta_k, \varphi_k)$, which are expressed as:

$$a_{Mx}(\theta_k, \varphi_k) = \left[1, e^{-j\pi u_1^{(2)}\sin(\varphi_k)\cos(\theta_k)}, \ldots, e^{-j\pi u_1^{(2M_x)}\sin(\varphi_k)\cos(\theta_k)}\right]^T,$$

$$a_{My}(\theta_k, \varphi_k) = \left[1, e^{-j\pi v_1^{(2)}\sin(\varphi_k)\cos(\theta_k)}, \ldots, e^{-j\pi v_1^{(2M_y)}\sin(\varphi_k)\cos(\theta_k)}\right]^T,$$

where $u_1^{(i_1)}$ ($i_1=1, 2, \ldots, 2M_x$) and $\mathcal{V}^{(i_2)}$ ($i_2=1, 2, \ldots, 2M_y$) respectively represent actual positions of the $i_1^{th}$ physical sensor and the $i_2^{th}$ physical sensor of the first sparse uniform subarray $\mathbb{U}_1$ in the x-axis and y-axis directions, and $u_1^{(1)}=0$, $\mathcal{V}_1^{(1)}=0$, $j=\sqrt{-1}$;

and the received signals of the sparse subarray $\mathbb{U}_2$ being expressed by using another three-dimensional tensor $\mathcal{X}_2 \in \mathbb{C}^{N_x \times N_y \times L}$ as:

$$x_2 = \sum_{k=1}^{K} a_{Nx}(\theta_k, \varphi_k) \circ a_{Ny}(\theta_k, \varphi_k) \circ s_k + \mathcal{N}_2,$$

where $\mathcal{N}_2$ is a noise tensor independent of each source, $a_{Nx}(\theta_k, \varphi_k)$ and $a_{Ny}(\theta_k, \varphi_k)$ are respectively steering vectors of the second sparse uniform subarray $\mathbb{U}_2$ in the X-axis and Y-axis directions, corresponding to the $k^{th}$ source with a direction-of-arrival of $(\theta_k, \varphi_k)$ which are expressed as:

$$a_{Nx}(\theta_k, \varphi_k) = \left[1, e^{-j\pi u_2^{(2)}\sin(\varphi_k)\cos(\theta_k)}, \ldots, e^{-j\pi u_2^{(N_x)}\sin(\varphi_k)\cos(\theta_k)}\right]^T,$$

$$a_{Ny}(\theta_k, \varphi_k) = \left[1, e^{-j\pi v_2^{(2)}\sin(\varphi_k)\cos(\theta_k)}, \ldots, e^{-j\pi v_2^{(N_y)}\sin(\varphi_k)\cos(\theta_k)}\right]^T,$$

where $u_2^{(i_3)}$ ($i_3=1, 2, \ldots, N_x$) and $\mathcal{V}_2^{(i_4)}$ ($i_4=1, 2, \ldots, N_y$) respectively represent actual positions of the $i_3^{th}$ physical sensor and the $i_4^{th}$ physical sensor of the second sparse uniform subarray $\mathbb{U}_2$ in the x-axis and y-axis directions, and $u_2^{(1)}=0$, $\mathcal{V}_2^{(1)}=0$;

a second-order cross-correlation tensor $\hat{\mathcal{R}} \in \mathbb{C}^{2M_x \times 2M_y \times N_x \times N_y}$ of the received tensor signals $\mathcal{X}_1$ and $\mathcal{X}_2$ of the first-sparse uniform subarray $\mathbb{U}_1$ and the second sparse uniform subarray $\mathbb{U}_2$ is calculated as follows:

$$\hat{R} = \frac{1}{L}\sum_{l=1}^{L} x_1(l) \circ x_2^*(l),$$

where, $\mathcal{X}_1(l)$ and $\mathcal{X}_2(l)$ respectively represent a $l^{th}$ slice of $\mathcal{X}_1$ and $\mathcal{X}_2$ in a third dimension (i.e., a snapshot dimension), and $(\bullet)^*$ represents a conjugate operation;

(3) obtaining, by the receiving end, an augmented non-uniform virtual array $\mathcal{L}$ based on the cross-correlation tensor $\hat{\mathcal{R}}$, wherein every element in PARAFAC-based unfolding of the cross-correlation tensor $\hat{\mathcal{R}}$ corresponds to a virtual sensor, and a position of each virtual sensor is expressed as:

$$\mathcal{L} = \{(-M_x n_x d + N_x m_x d, -M_y n_y d + N_y m_y d) | 0 \leq n_x \leq N_x - 1, 0 \leq m_x \leq 2M_x - 1, 0 \leq n_y \leq N_y - 1, 0 \leq m_y \leq 2M_y - 1\},$$

where a unit interval d is half of a wavelength λ of an incident narrowband signal, that is, d=λ/2; dimension sets $\mathbb{J}_1=\{1, 3\}$ and $\mathbb{J}=\{2, 4\}$ are defined, and then an ideal value $\mathcal{R}$ (a noise-free scene) of the cross-correlation tensor $\hat{\mathcal{R}}$ is subjected to modulo $\{\mathbb{J}_1, \mathbb{J}_{21}, \mathbb{J}_1, \mathbb{J}_{22}\}$ PARAFAC-based unfolding to obtain an ideal expression of the equivalent signals $V \in \mathbb{C}^{2M_xN_x \times 2M_yN_y}$ of the augmented virtual array $\mathcal{L}$ as:

$$V \triangleq \mathcal{R}_{\{\mathbb{J}_1, \mathbb{J}_2\}} = \Sigma_{k=1}^{K} \sigma_k^1 a_x(\theta_k, \varphi_k) \circ a_y(\theta_k, \varphi_k),$$

where $a_x(\theta_k, \varphi_k)=a^*_{Nx}(\theta_k, \varphi_k) \otimes a_{Mx}(\theta_k, \varphi_k)$ and $a_y(\theta_k, \varphi_k)=a^*_{Ny}(\theta_k, \varphi_k) \otimes a_{My}(\theta_k, \varphi_k)$ are steering vectors of the augmented virtual array $\mathcal{L}$ in the x-axis and y-axis directions, corresponding to $k^{th}$ source with a direction-ofarrival of $(\theta_k, \varphi_k)$; $\sigma_k^2$ represents the power of a $k^{th}$ incident source; $\otimes$ represents a Kronecker product; a subscript of the tensor represents the PARAFAC-based tensor unfolding;

(4) obtaining, by the receiving end, equivalent signals $\nabla$ of the augmented virtual array $\mathcal{L}$, wherein a process of said obtaining the by the receiving end, equivalent signals $\nabla$ of the augmented virtual array $\mathcal{L}$ comprises:

$\mathcal{L}$ containing a virtual array $\mathbb{J}$ with an x-axis distribution from $(-N_x+1)d$ to $(M_xN_x+M_x-1)d$ and a y-axis distribution from $(-N_y+1)d$ to $(M_yN_y+M_y-1)d$; wherein there are $D_x \times D_y$ virtual sensors in total in $\mathbb{J}$, where $D_x=M_xN_x+M_x+N_x-1$, $D_y=m_yN_y+M_y+N_y-1$, and $\mathbb{J}$ is expressed as:

$$\mathbb{J}=\{(x,y)|x=p_xd, y=p_yd, -N_x+1 \leq p_x \leq M_xN_x+M_x-1, -N_y+1 \leq p_y \leq M_yN_y+M_y-1\},$$

obtaining, by the receiving end, the equivalent signals $\bar{\nabla} \in \mathbb{C}^{D_x \times D_y}$ of the virtual array $\mathbb{J}$ by selecting elements in the coarray signals $V$ corresponding to the position of each virtual sensor of $\mathbb{J}$, wherein the equivalent signals $\bar{\nabla}$ are expressed as:

$$\bar{\nabla} = \sum_{k=1}^{K} \sigma_k^2 b_x(\theta_k, \varphi_k) \circ b_y(\theta_k, \varphi_k),$$

where $$b_x(\theta_k, \varphi_k) = [e^{-j\pi(-N_x+1)sin(\varphi_k)cos(\theta_k)}, e^{-j\pi(-N_x+2)sin(\varphi_k)cos(\theta_k)}, \ldots, e^{-j\pi(M_xN_x+M_x-1)sin(\varphi_k)cos(\theta_k)}]$$

and $$b_y(\theta_k, \varphi_k) = [e^{-j\pi(-N_y+1)sin(\varphi_k)sin(\theta_k)}, e^{-j\pi(-N_y+2)sin(\varphi_k)sin(\theta_k)}, \ldots, e^{-j\pi(M_yN_y+M_y-1)sin(\varphi_k)sin(\theta_k)}]$$

are steering vectors of the virtual array $\mathbb{J}$ in the x-axis and y-axis directions, corresponding to $k^{th}$ source with a direction-of-arrival of $(\theta_k, \varphi_k)$;

(5) obtaining, by the receiving end, spatially smoothed coarray signals $\tilde{V}$ by diving the virtual array $\mathbb{J}$, wherein a process of said obtaining, by the receiving end, spatially smoothed coarray signals $\tilde{V}$ by diving the virtual array $\mathbb{J}$ comprises:

in the virtual array $\mathbb{J}$, taking a subarray with a size of $Y_1 \times Y_2$ for every other sensors along the x-axis and y-axis directions respectively, to divide the virtual array $\mathbb{J}$ into $L_1 \times L_2$ uniform subarrays partly overlapping with each other; expressing the above subarray as $\mathbb{J}_{(g_1,g_2)}$, $g_1=1, 2, \ldots, L_1$, $g_2=1, 2, \ldots, L_2$, and obtaining, by the receiving end, the equivalent signals $\bar{\nabla}_{(g_1,g_2)} \in \mathbb{C}^{Y_1 \times Y_2}$ of the virtual subarray $\mathbb{J}_{(g_1,g_2)}$ according to respective position elements in the coarray signals $\bar{\nabla}$ corresponding to the subarray $\mathbb{J}_{(g_1,g_2)}$:

$$\bar{\nabla}_{(g_1,g_2)} = \sum_{k=1}^{K} \sigma_k^2 (c_x(\theta_k,\varphi_k) e^{(g_1-1)sin(\varphi_k)cos(\theta_k)}) \circ (c_y(\theta_k\varphi_k) e^{(g_2-1)sin(\varphi_k)sin(\theta_k)}),$$

where $$c_x(\theta_k, \varphi_k) = [e^{-j\pi(-N_x+1)sin(\varphi_k)cos(\theta_k)}, e^{-j\pi(-N_x+2)sin(\varphi_k)cos(\theta_k)}, \ldots, e^{-j\pi(M_xN_x+M_x-1)sin(\varphi_k)cos(\theta_k)}]$$

$$c_y(\theta_k, \varphi_k) = [e^{-j\pi(-N_y+1)sin(\varphi_k)sin(\theta_k)}, e^{-j\pi(-N_y+2)sin(\varphi_k)sin(\theta_k)}, \ldots, e^{-j\pi(M_yN_y+M_y-1)sin(\varphi_k)sin(\theta_k)}]$$

are steering vectors of the virtual subarray $\mathbb{J}_{(1,1)}$ in the x-axis and y-axis corresponding to the direction of $(\theta_k, \varphi_k)$; after the above operation, a total of $L_1 \times L_2$ coarray signals $\bar{\nabla}_{(g_1,g_2)}$, the dimensions of which are all $Y_1 \times Y_2$ are obtained by the receiving end; and the spatially smoothed coarray signals $\tilde{V} \in \mathbb{C}^{Y_1 \times Y_2 \times Y_1 \times Y_2}$ is obtained by the receiving end by taking an average of the $L_1 \times L_2$ coarray signals $V\bar{\nabla}_{(g_1,g_2)}$:

$$\tilde{V} = \frac{1}{L_1 L_2} \sum_{p=1}^{L_1} \sum_{q=1}^{L_2} \bar{\nabla}_{(p,q)},$$

a fourth-order auto-correlation tensor $\mathcal{V} \in \mathbb{C}^{Y_1 \times Y_2 \times Y_1 \times Y_2}$ for the coarray signal $\tilde{V}$ calculated by the receiving end as follows:

$$\mathcal{V} = \tilde{V} \circ \tilde{V}^*;$$

(6) performing, by the receiving end, CANDECOMP/PARACFAC decomposition on the fourth-order auto-correlation tensor $\mathcal{V}$ to extract multi-dimensional features, a result of which is expressed as follows:

$$\mathcal{V} = \sum_{k=1}^{K} \tilde{c}_x(\theta_k, \varphi_k) \circ \tilde{c}_y(\theta_k,\varphi_k) \circ \tilde{c}^*_x(\theta_k,\varphi_k) \circ \tilde{c}^*_y(\theta_k,\varphi_k),$$

where $\tilde{c}_x(\theta_k, \varphi_k)(k=1, 2, \ldots, K)$ and $\tilde{c}_y(\theta_k, \varphi_k)(k=1, 2, \ldots, K)$ are two orthogonal factor vectors obtained by the CANDECOMP/PARACFAC decomposition, respectively representing spatial information in the x-axis and y-axis directions; $C_x=[\tilde{c}_x(\theta_1, \varphi_1), \tilde{c}_x(\theta_2, \varphi_2), \ldots, \tilde{c}_x(\theta_K, \varphi_K)]$ and $C_y=[\tilde{c}_y(\theta_1, \varphi_1), \tilde{c}_y(\theta_2, \varphi_2), \ldots, \tilde{c}_y(\theta_K, \varphi_K)]$ are factor matrixes; a space expanded by $\{\tilde{c}_x(\theta_k, \varphi_k) \circ \tilde{c}_y(\theta_k, \varphi_k), k=1, 2, \ldots, K\}$ is taken and is recorded as span$\{\tilde{c}_x(\theta_k, \varphi_k) \circ \tilde{c}_y(\theta_k, \varphi_k), k=1, 2, \ldots, K\}$ as a signal subspace; the signal subspace is expressed using a tensor $\mathcal{Z}_s \in \mathbb{C}^{Y_1 \times Y_2 \times K}$ where $\mathcal{Z}_s(k)$ represents a $k^{th}$ slice of $\mathcal{Z}_s$ along the third dimension, which is expressed as:

$$\mathcal{Z}_s(k) = \tilde{c}_x(\theta_k,\varphi_k) \circ \tilde{c}_y(\theta_k,\varphi_k);$$

in order to obtain the noise subspace, the orthocomplements of the factor matrices $C_x$ and $C_y$ are calculated; the orthocomplement of $C_x$ is recorded as span$\{\tilde{d}_{x,h}, h=1, 2, \ldots, \min(Y_1, Y_2)-K\}$, and the orthocomplement of $C_y$ is recorded as span$\{\tilde{d}_{y,h}, h=1, 2, \ldots, \min(Y_1, Y_2)-K\}$, where $\min(\cdot)$ represents the minimum operation; then span$\{\tilde{d}_{x,h} \circ \tilde{d}_{y,h}, h=1, 2, \ldots, \min(Y_1, Y_2)-K\}$ is taken as the noise subspace, and the tensor $\mathcal{Z}_n \in \mathbb{C}^{Y_1 \times Y_2 \times (\min(Y_1,Y_2)-K)}$ is used to express the noise subspace, and $\mathcal{Z}_n(h)$ represents a $h^{th}$ slice of $\mathcal{Z}_n$ along the third dimension, which is expressed as:

$$\mathcal{Z}_n(h) = \tilde{d}_{x,h} \circ \tilde{d}_{y,h};$$

and (7) obtaining, by the receiving end, a two-dimensional direction-of-arrival by tensor spatial spectrum searching, wherein a process of said obtaining, by the receiving end, a two-dimensional direction-of-arrival by tensor spatial spectrum searching comprises:

defining a two-dimensional direction-of-arrival $(\tilde{\theta}, \tilde{\varphi})$ for spectral peak searching, a $\tilde{\theta} \in [-90°, 90°]$, $\tilde{\varphi} \in [0°, 180°]$, and constructing steering information $F(\tilde{\theta}, \tilde{\varphi}) \in \mathbb{C}^{Y_1 \times Y_2}$ corresponding to the virtual array $\mathbb{J}$ are constructed, which is expressed as:

$$F(\tilde{\theta}, \tilde{\varphi}) = c_x(\tilde{\theta}, \tilde{\varphi}) \circ c_y(\tilde{\theta}, \tilde{\varphi}),$$

constructing, by the receiving end, a tensor spatial spectrum function $\mathcal{P}_{CP}(\tilde{\theta}, \tilde{\varphi})$ using the noise subspace obtained from the CANDECOMP/PARACFAC decomposition, which is expressed as follows:

$$\mathcal{P}_{CP}(\tilde{\theta},\tilde{\varphi}) = \| < \mathcal{Z}_n \times_{\{1,2\}} F(\tilde{\theta},\tilde{\varphi}) > \|_F^{-2},$$

where $\langle x_{\{Q\}}\rangle$ represents a modulo $\{Q\}$ contraction operation of two tensors along a $Q^{th}$ dimension, which requires a same size of the $Q^{th}$ dimension of the two tensors; $\|\cdot\|_F$ represents a Frobenius norm; $\mathcal{Z}_n \in \mathbb{C}^{Y_1 \times Y_2 \times (min(Y_1,Y_2)-K)}$ and $F(\tilde{\theta}, \tilde{\varphi}) \in \mathbb{C}^{Y_1 \times Y_2}$ are subjected to modulo $\{1, 2\}$ contraction operation along the $1^{st}$ and $2^{nd}$ dimensions to obtain one vector $p \in \mathbb{C}^{min(Y_1,Y_2)-K}$; after obtaining the spatial spectrum function $\mathcal{P}_{CP}(\tilde{\theta}, \tilde{\varphi})$, the receiving end construct the spatial spectrum corresponding to searching directions of the two-dimensional direction-of-arrival, then the estimation of two-dimensional direction-of-arrival of the incident source is obtained by searching for the two-dimensional direction-of-arrival corresponding to the position of the spectral peak.

2. The high-resolution accurate two-dimensional direction-of-arrival estimation method based on coarray tensor spatial spectrum searching with coprime planar array according to claim 1, wherein the receiving end described in step (1) is decomposed into a first sparse uniform subarray $\mathbb{U}_1$ and a second sparse uniform subarray $\mathbb{U}_2$ constructed on a planar coordinate system xoy, wherein $\mathbb{U}_1$ contains $2M_x \times 2M_y$ antenna sensors, the sensor spacing in the x-axis direction and the y-axis direction are $N_x d$ and $N_y d$ respectively, and the coordinate of which on xoy is $\{(N_x dm_x, N_y dm_y), m_x=0, 1, \ldots, 2M_x-1, m_y=0, 1, \ldots, 2M_y-1\}$; $\mathbb{U}_2$ contains $N_x \times N_y$ antenna sensors, the sensor spacing in the x-axis direction and the y-axis direction are $M_x d$ and $M_y d$ respectively, and the coordinate of which on xoy is $\{(M_x dn_x, M_y dn_y), n_x=0, 1, \ldots, N_x-1, n_y=0, 1, \ldots, N_y-1\}$; wherein $M_x, N_x$ and $M_y, N_y$ are respectively a pair of coprime integers, and $M_x < N_x, M_y < N_y$; $\mathbb{U}_1$ and $\mathbb{U}_2$ are subjected to subarray combination in a way of overlapping array elements at $(0,0)$ coordinate to obtain a coprime planar array actually containing $(4M_x M_y + N_x N_y - 1)$ physical antenna sensors.

3. The high-resolution accurate two-dimensional direction-of-arrival estimation method based on coarray tensor spatial spectrum searching with coprime planar array according to claim 1, wherein the cross-correlation tensor $\tilde{\mathcal{R}}$ described in step (3) is ideally (a noise-free scene) modeled as:

$$\mathcal{R} = \sum_{k=1}^{K} \sigma_k^2 a_{Mx}(\theta_k, \varphi_k) \circ a_{My}(\theta_k, \varphi_k) \circ a^*_{Nx}(\theta_k, \varphi_k) \circ a^*_{Ny}(\theta_k, \varphi_k),$$

where $a_{Mx}(\theta_k, \varphi_k) \circ a^*_{Nx}(\theta_k, \varphi_k)$ in $\mathcal{R}$ is equivalent to an augmented coarray along the x-axis, and $a_{My}(\theta_k, \varphi_k) \circ a^*_{Ny}(\theta_k, \varphi_k)$ is equivalent to an augmented coarray along the y-axis, so that the non-uniform virtual array $\mathcal{L}$ is obtained.

4. The high-resolution accurate two-dimensional direction-of-arrival estimation method based on coarray tensor spatial spectrum searching with coprime planar array according to claim 1, wherein the equivalent signals $\nabla$ of the virtual uniform array $\mathbb{J}$ described in step (5) saves spatial structural information of the virtual domain, however, since $\nabla$ can be regarded as the single snapshot coarray signals, the statistics thereof has a rank deficiency problem; therefore, based on the idea of two-dimensional spatial smoothing, the coarray signals $\nabla$ are processed to construct equivalent multi-snapshot coarray signals; after the partitioned coarray signals are summed and averaged, the fourth-order auto-correlation tensor thereof is calculated; the position of the virtual sensor in the subarray $\mathbb{J}_{(g_1,g_2)}$ is expressed as:

$$\mathbb{J}_{(g_1,g_2)} = \{(x,y) | X=p_x d, y=p_y d, -N_x+g_1 \le p_x \le -N_x+g_1+Y_1-1, -N_y+g_2 \le p_y \le -N_y+g_2+Y_2-1\};$$

the equivalent signals $\nabla_{(g_1,g_2)}$ of the virtual subarray $\mathbb{J}_{(g_1,g_2)}$ is obtained by selecting corresponding position elements in the coarray signals $\nabla$ through the subarray $\mathbb{J}_{(g_1,g_2)}$.

5. The high-resolution accurate two-dimensional direction-of-arrival estimation method based on coarray tensor spatial spectrum searching with coprime planar array according to claim 1, wherein in addition to the CANDECOMP/PARACFAC decomposition, extraction of the multi-dimensional features of the fourth-order auto-correlation coarray tensor in step (6) can also be realized by a high-order singular value decomposition, which is specifically expressed as:

$$\mathcal{V} = \mathcal{K} \times_1 D_x \times_2 D_y \times_3 D^*_x \times_4 D^*_y,$$

where $\times_Q$ represents a modulo Q inner product of the tensor and the matrix along the $Q^{th}$ dimension; $\mathcal{K}$ represents a kernel tensor containing high-order singular values, $D_x \in \mathbb{C}^{Y_1 \times Y_1}$, $D_y \in \mathbb{C}^{Y_2 \times Y_2}$, $D^*_x \in \mathbb{C}^{Y_1 \times Y_1}$ and $D^*_y \in \mathbb{C}^{Y_2 \times Y_2}$ represent singular matrixes corresponding to four dimensions of $\mathcal{V}$; the first K columns and the last $(Y_1-K)$ columns of $D_x$ are separated into a signal subspace $D_{xs} \in \mathbb{C}^{Y_1 \times K}$ and a noise subspace $D_{xn} \in \mathbb{C}^{Y_1 \times (Y_1-K)}$; and the first K columns and the last $(Y_2-K)$ columns of $D_y$ are separated into a signal subspace $D_{ys} \in \mathbb{C}^{Y_2 \times K}$ and a noise subspace $D_{yn} \in \mathbb{C}^{Y_2 \times (Y_2-K)}$.

6. The high-resolution accurate two-dimensional direction-of-arrival estimation method based on coarray tensor spatial spectrum searching with coprime planar array according to claim 5, wherein construction of the tensor spatial spectrum described in step (7) can also be implemented using the noise subspace obtained based on the high-order singular value decomposition, which is expressed as $\mathcal{P}_{HOSVD}(\tilde{\theta}, \tilde{\varphi})$:

$$\mathcal{P}_{HOSVD}(\tilde{\theta}, \tilde{\varphi}) = \|F(\tilde{\theta}, \tilde{\varphi}) \times_1 D_{xn} D_{xn}^H \times_2 D_{yn} D_{yn}^H\|^{-2},$$

where, $(\cdot)^H$ represents a conjugate transposition operation; after obtaining the spatial spectrum function $\mathcal{P}_{HOSVD}(\tilde{\theta}, \tilde{\varphi})$, the two-dimensional direction-of-arrival estimation of the source can be obtained according to a two-dimensional spectral peak searching process.

7. The high-resolution accurate two-dimensional direction-of-arrival estimation method based on coarray tensor spatial spectrum searching with coprime planar array according to claim 1, wherein the specific steps of searching for two-dimensional spectrum peaks after obtaining the spatial spectrum function $\mathcal{P}_{CP}(\tilde{\theta}, \tilde{\varphi})$ in step (7) are: using a° as a step length to gradually increase the value of $(\theta, \varphi)$, wherein a search starting point of the two-dimensional direction-of-arrival $(\tilde{\theta}, \tilde{\varphi})$ is $(-90°, 0°)$, and an end point is $(90°, 180°)$; a spatial spectrum value of one $\mathcal{P}_{CP}(\tilde{\theta}, \tilde{\varphi})$ can be correspondingly calculated for each $(\tilde{\theta}, \tilde{\varphi})$, so that one spatial spectrum corresponding to $(\tilde{\theta}, \tilde{\varphi})$, $\tilde{\theta} \in [-90°, 90°]$, $\tilde{\varphi} \in [0°, 180°]$ can be constructed; there are K peaks in the spatial spectrum, and the values of $(\tilde{\theta}, \tilde{\varphi})$ corresponding to the K peaks are the two-dimensional direction-of-arrival estimation of the source.

* * * * *